(12) United States Patent
Liu et al.

(10) Patent No.: US 12,162,783 B2
(45) Date of Patent: Dec. 10, 2024

(54) SALINE WASTEWATER TREATMENT METHOD AND SYSTEM

(71) Applicant: Greentech Environment Co., Ltd., Beijing (CN)

(72) Inventors: Mu Liu, Beijing (CN); Kai Sun, Beijing (CN); Zehua Li, Beijing (CN); Yingqiang Su, Beijing (CN); Mengyuan Duan, Beijing (CN); Xikun Zhu, Beijing (CN); Liyan Zhang, Beijing (CN); Cong Xiao, Beijing (CN); Huiming Han, Beijing (CN)

(73) Assignee: Greentech Environment Co., Ltd., Beijing (CN)

( * ) Notice: Subject to any disclaimer, the term of this patent is extended or adjusted under 35 U.S.C. 154(b) by 0 days.

(21) Appl. No.: 18/674,800

(22) Filed: May 24, 2024

(65) Prior Publication Data
US 2024/0308882 A1  Sep. 19, 2024

(30) Foreign Application Priority Data
Jun. 8, 2023 (CN) .......................... 202310676144.8

(51) Int. Cl.
*C02F 1/44* (2023.01)
*C02F 1/78* (2023.01)
*C02F 9/00* (2023.01)

(52) U.S. Cl.
CPC ................ *C02F 1/44* (2013.01); *C02F 1/441* (2013.01); *C02F 1/442* (2013.01); *C02F 1/444* (2013.01);
(Continued)

(58) Field of Classification Search
CPC ........ C02F 1/44; C02F 1/78; C02F 2209/003; C02F 2209/03; C02F 2303/18; C02F 1/441; C02F 1/442; C02F 1/444; C02F 9/00
See application file for complete search history.

(56) References Cited

U.S. PATENT DOCUMENTS 5,578,205 A  11/1996 Trailigaz
2019/0118142 A1  4/2019 Earthman et al.

FOREIGN PATENT DOCUMENTS

CN  101402021 A  *  4/2009
CN  103736409 A     4/2014
(Continued)

OTHER PUBLICATIONS

Machine translation of CN 101402021 A.*
(Continued)

*Primary Examiner* — Benjamin L Lebron

(57) ABSTRACT

A saline wastewater treatment method is provided. Raw water is pretreated to obtain pretreated raw water. The pretreated raw water is pressurized to a preset pressure, injected with zone, separated and filtered by a filtering device with a hollow fiber nanofiltration membrane or a hollow fiber reverse osmosis membrane inside to obtain a concentrate and a permeate. A pressure of the concentrate is controlled such that ozone in the concentrate is released to form micro-nano bubbles. The concentrate is partially injected into the pretreated raw water. A pressure of the permeate and a pressure of the raw water are respectively controlled such that ozone in the permeate and the raw water is released inside the filtering device to form micro-nano bubbles to flush the hollow fiber nanofiltration membrane or the hollow fiber reverse osmosis membrane. A saline wastewater treatment system is also provided.

4 Claims, 4 Drawing Sheets

(52) U.S. Cl.
CPC .................. *C02F 1/78* (2013.01); *C02F 9/00* (2013.01); *C02F 2209/003* (2013.01); *C02F 2209/03* (2013.01); *C02F 2303/18* (2013.01)

(56) References Cited

FOREIGN PATENT DOCUMENTS

| | | |
|---|---|---|
| CN | 209940546 U | 1/2020 |
| CN | 113735348 A | 12/2021 |
| CN | 216236437 U | 4/2022 |
| CN | 216639174 U | 5/2022 |
| CN | 114772821 A | 7/2022 |
| JP | 4649529 B1 | 3/2011 |
| KR | 20090089750 A | 8/2009 |
| WO | 2006127979 A2 | 11/2006 |

OTHER PUBLICATIONS

Loh, W.H., "Reverse osmosis concentrate treatment by microbubble ozonation-biological activated carbon process: organics removal performance and environmental impact assessment", Science of the Total Environment, 798, 149289. (Year: 2021).*

* cited by examiner

SALINE WASTEWATER TREATMENT METHOD AND SYSTEM

CROSS-REFERENCE TO RELATED APPLICATIONS

This application claims the benefit of priority from Chinese Patent Application No. 202310676144.8, filed on Jun. 8, 2023. The content of the aforementioned application, including any intervening amendments made thereto, is incorporated herein by reference in its entirety.

TECHNICAL FIELD

This application relates to water treatment, and more particularly to a saline wastewater treatment method and system.

BACKGROUND

The economic and industrial development broadens the sources of saline wastewater. In the daily industrial production, salt is often used in chemical synthesis, food and drug processing, and leather product production, resulting in a large amount of wastewater containing salt and organic matters. The existence of saline wastewater will adversely affect the normal life and production, and thus the rational, economical and effective treatment of saline wastewater has become a research hotspot in the industry.

At present, the membrane separation technology (e.g., nanofiltration and reverse osmosis) has been extensively used in water softening, desalination and organic pollutants removal. However, the nature and relative molecular weight of organic matters will significantly influence the interaction between the organic matters and the membrane. Those organic matters with a larger relative molecular weight are more likely to cause a decrease in the membrane flux, resulting in membrane fouling. Therefore, if the organic matter in the raw saline wastewater has a relatively high concentration or a relatively large molecular weight, the membrane fouling is prone to occurring. Therefore, the nanofiltration or reverse osmosis cannot be directly used in the treatment of such wastewater.

Therefore, there is an urgent need to develop a saline wastewater treatment method and system to solve the above problems.

SUMMARY

In order to overcome the above technical problems in the prior art, this application provides a saline wastewater treatment method and system.

Technical solutions of the present disclosure are described as follows.

In a first aspect, this application provides a saline wastewater treatment method, comprising:
- (S1) pretreating a raw water sample to obtain a pretreated raw water sample;
- (S2) pressurizing the pretreated raw water sample to a preset pressure followed by ozone injection to obtain a pressurized and ozone-injected raw water sample;
- (S3) separating and filtering, by a filtering device with a hollow fiber nanofiltration membrane or a hollow fiber reverse osmosis membrane inside, the pressurized and ozone-injected raw water sample to obtain a concentrate and a permeate, wherein a pressure of the permeate is lower than a pressure of the raw water sample;
- (S4) controlling a pressure of the concentrate such that ozone in the concentrate discharged from the filtering device is released to form micro-nano bubbles, and partially injecting the concentrate into a next pretreated raw water sample; wherein the pressure of the concentrate is controlled to decrease such that ozone can be released in the form of micro-nano bubbles during decompression, a high specific surface area of the micro-nano bubbles not only effectively increases a mass transfer efficiency of ozone dissolved in water, but also prolongs a reaction time of the entire system, allowing organic pollutants in the permeate and the concentrate to be basically ozonized; and
- (S5) controlling the pressure of the permeate such that ozone in the permeate is released inside the filtering device to form micro-nano bubbles to flush a permeate side of the hollow fiber nanofiltration membrane or the hollow fiber reverse osmosis membrane; wherein a pressure at the permeate side of the hollow fiber nanofiltration membrane or the hollow fiber reverse osmosis membrane is much smaller than the pressure at a filtering side, the pressure of the permeate is controlled such that ozone partially dissolved in the permeate is released in the form of micro-nano bubbles inside the filtering device, which can flush and clean the hollow fiber nanofiltration membrane or the hollow fiber reverse osmosis membrane, while degrading organic pollutants on a surface of the hollow fiber nanofiltration membrane or the hollow fiber reverse osmosis membrane, and can also strengthen an oxidation effect of organic matter in the permeate.

In some embodiments, the saline wastewater treatment method further comprises:
- (S6) controlling a pressure inside the filtering device such that ozone in the pressurized and ozone-injected raw water sample is released inside the filtering device to form micro-nano bubbles to flush a filtering side of the hollow fiber nanofiltration membrane or the hollow fiber reverse osmosis membrane.

The permeate and the concentrate are produced on both sides of the hollow fiber nanofiltration membrane or the hollow fiber reverse osmosis membrane, respectively. During normal filtration of the raw water sample, a pressure in the filtering device is relatively large, such that the ozone in the concentrate is difficult to be released. After filtering the raw water sample, the pressure of the filtering device can be controlled to reduce the pressure of the raw water sample, allowing the raw water sample to release dissolved ozone inside the filtering device to form the micro-nano bubbles, thereby flushing the filtering side of the hollow fiber nanofiltration membrane or the hollow fiber reverse osmosis membrane.

In some embodiments, the saline wastewater treatment method further comprises: destroying remaining ozone in the permeate.

In some embodiments, the saline wastewater treatment method further comprises: destroying remaining ozone in the concentrate.

In some embodiments, in step (S2), the preset pressure is 0.4-8 MPa.

In some embodiments, the hollow fiber nanofiltration membrane or the hollow fiber reverse osmosis membrane has the permeate side and the filtering side; the pressure at the filtering side is higher than the pressure at the permeate side; the concentrate is generated at the filtering side; and the permeate is generated at the permeate side.

In a second aspect, this application provides a saline wastewater treatment system that adopts the above saline wastewater treatment method, the system comprising a pretreating device, a pressurizing device, an ozone generator, an ozone injection device and a filtering device; wherein the pretreating device is configured to pretreat raw water; the pressurizing device is configured to pressurize the raw water; the ozone injection device is connected to the filtering device; the ozone generator is connected to the ozone injection device; and the filtering device comprises a hollow fiber nanofiltration membrane or a hollow fiber reverse osmosis membrane.

In some embodiments, the filtering device further comprises a housing; a bottom of the housing is provided with a raw water inlet pipe; a top of the housing is provided with a permeate pipe and a concentrate pipe; and the hollow fiber nanofiltration membrane is vertically mounted in the housing.

In some embodiments, the concentrate pipe is provided with a first control valve; and the permeate pipe is provided with a second control valve.

In some embodiments, the saline wastewater treatment system further comprises a concentrate pool configured to receive the concentrate; and the concentrate pool is connected to the concentrate pipe through a pipeline.

In some embodiments, the saline wastewater treatment system further comprises a permeate pool configured to receive the permeate; and the permeate pool is connected to the permeate pipe through a pipeline.

Compared to the prior art, this application has the following beneficial effects.

The saline wastewater treatment method requires a high filtration pressure when filtering using the hollow fiber nanofiltration membrane or the hollow fiber reverse osmosis membrane to dissolve ozone in high-pressure raw water. High pressure leads to an increase in a dissolved concentration of the ozone, thereby improving the ozonation efficiency of organic pollutants. By means of the filtration and separation performance of the hollow fiber nanofiltration membrane 42 or the hollow fiber reverse osmosis membrane, salts and organic matters are removed from the saline wastewater. In addition, the pressure of the permeate is controlled such that the ozone dissolved in the permeate is released in the filtering device to form the micro-nano bubbles, so as to flush and clean the hollow fiber nanofiltration membrane or the hollow fiber reverse osmosis membrane, thereby avoiding clogging of the hollow fiber nanofiltration membrane or the hollow fiber reverse osmosis membrane, and degrading organic pollutants on the surface of the hollow fiber nanofiltration membrane or the hollow fiber reverse osmosis membrane. Moreover, the pressure of the concentrate is controlled such that the ozone in the concentrate discharged from the filtering device 4 is released to form the micro-nano bubbles. The high specific surface area of the micro-nano bubbles not only effectively increases the mass transfer efficiency of ozone dissolved in water and improves the ozonation efficiency, but also prolongs the reaction time of the entire system, allowing the organic pollutants in the concentrate to be basically ozonized.

In addition, compared to the prior art, the saline wastewater treatment method provided herein enables the simultaneous desalination and organic matter removal of the saline wastewater, and can avoid the fouling of the hollow fiber nanofiltration membrane or the hollow fiber reverse osmosis membrane, allowing for shortened process and improved efficiency.

BRIEF DESCRIPTION OF THE DRAWINGS

The accompanying drawings, which are incorporated into and constitute a part of this specification, are intended to illustrate the embodiments of the disclosure, and are used for explaining the principles of the disclosure in conjunction with the specification.

In order to illustrate the technical solutions in the embodiments of the present disclosure or in the prior art more clearly, the drawings needed in the description of embodiments or the prior art will be briefly introduced below. Obviously, for those of ordinary skill in the art, other drawings can be obtained based on these drawings without exerting creative efforts.

Figure 1:
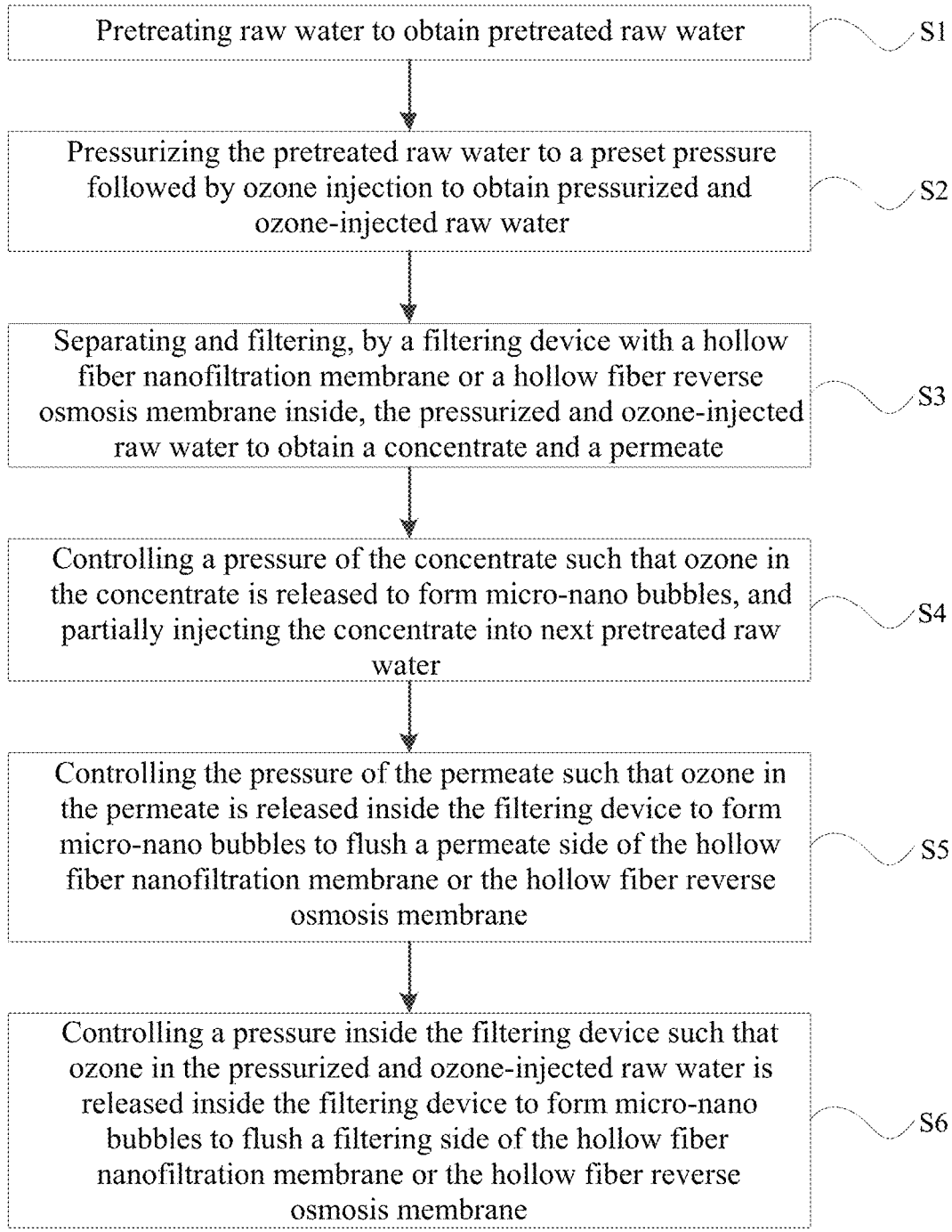
FIG. 1 is a flow chart of a saline wastewater treatment method in accordance with an embodiment of the present disclosure.

In the drawings: 1. pretreating device; 2. pressurizing device; 3. ozone injection device; 4. filtering device; 41. housing; 42. hollow fiber nanofiltration membrane; 43. raw water inlet pipe; 44. permeate pipe; 45. concentrate pipe; 5. ozone generator; 6. concentrate pool; 7. permeate pool; and 8. tail gas destruction device.

DETAILED DESCRIPTION OF EMBODIMENTS

In order to understand the above objects, features and beneficial effects of the present disclosure more clearly, the technical solutions of the present disclosure will be further described below. It should be noted that, as long as there is no contradiction, the embodiments of the present disclosure and the features in the embodiments can be combined with each other.

Many specific details are set forth in the following description to facilitate the understanding of the present disclosure, but the present disclosure can also be implemented in other ways different from those described herein. Obviously, described herein are merely some embodiments of the present disclosure, rather than all embodiments.

As shown in FIG. 1, the present disclosure provides a saline wastewater treatment method for simultaneous desalination and removal of organic matters. The saline wastewater treatment method includes the following steps.

Step (1) A raw water sample is pretreated to obtain a pretreated raw water sample.

Step (2) The pretreated raw water sample is pressurized to a preset pressure and injected with ozone to obtain a pressurized and ozone-injected raw water sample.

Step (3) The pressurized and ozone-injected raw water sample is separated and filtered by a filtering device 4 with a hollow fiber nanofiltration membrane 42 or a hollow fiber reverse osmosis membrane inside to obtain a concentrate and a permeate.

Step (4) A pressure of the concentrate is controlled such that ozone in the concentrate discharged from the filtering device 4 is released to form micro-nano bubbles. The concentrate is partially returned to the pretreated raw water.

Step (5) A pressure of the permeate is controlled such that ozone in the concentrate is released inside the filtering device 4 to form micro-nano bubbles to flush the hollow fiber nanofiltration membrane 42 or the hollow fiber reverse osmosis membrane.

Owing to the strong oxidizing ability, ozone is considered as a novel, efficient and clean treatment method for wastewater samples containing refractorily-biodegradable organic pollutants, such as aromatic hydrocarbons, or with a low biochemical oxygen demand (BOD)/chemical oxygen demand (COD) (sometimes below 0.1). Although the ozone itself has a high oxidation-reduction potential, and strong decolorization ability as well as strong ability to destroy refractory organic matters, it has a strong selectivity of the oxidation of the organic matters, and its ability to mineralize organic minerals is obviously dependent on concentration and time. The pollutants cannot be completely mineralized in the case of low ozone concentration or insufficient treatment time. Moreover, the intermediate product generated by decomposition will hinder the ozone-mediated oxidation process. In the saline wastewater treatment method provided herein, the raw water is pressurized in advance, which can promote the dissolution of ozone, thus improving the ozonation efficiency of organic pollutants.

In some embodiments, in step (1), the raw water is pretreated through, but not limited to, sedimentation and coarse filtration.

In some embodiments, in step (2), the preset pressure is 0.4-8 MPa. In this way, a partial pressure of ozone in a gas phase is increased by 4-80 times such that a concentration of ozone dissolved in the raw water is increased to 4-80 times a conventional level. An ozone aqueous solution with a high concentration can greatly improve the ozonation effect on organic matters.

It should be noted that the preset pressure can be set according to actual needs, for example, determined according to an osmotic pressure of the saline wastewater. The preset pressure is also related to a type of a membrane. The smaller the pore size of the membrane, the higher the pressure. The higher the salt content, the higher the osmotic pressure, and the higher the required filtration pressure. For a semipermeable membrane with different aqueous solution concentrations on both sides, a minimum additional pressure exerted on a high-concentration side to prevent water from penetrating from a low-concentration side to the high-concentration side is called osmotic pressure.

The osmotic pressure is calculated through the following equation: $\pi=cRT$, where C is a molar concentration in mol/L, which can be calculated as C=n/V (amount of substance (mol)/volume (L)), R is an ideal gas constant, and T is a thermodynamic temperature in K. When a unit of $\pi$ is kPa and a unit of V is L, a value of R is 8.314 $J \cdot K^{-1} \cdot mol^{-1}$.

In some embodiments, in step (5), the pressure of the permeate is controlled such that the ozone in the concentrate is released inside the filtering device 4 to form the micro-nano bubbles, so as to flush the hollow fiber nanofiltration membrane 42 or the hollow fiber reverse osmosis membrane.

It can be understood that after the raw water is filtered by the hollow fiber nanofiltration membrane 42 or the hollow fiber reverse osmosis membrane to produce the permeate and the permeate flows out, the pressure of the permeate is reduced compared to a pressure of the raw water sample. The pressure of the permeate is controlled such that the ozone in the permeate can be released in the form of the micro-nano bubbles in the filtering device 4. The micro-nano bubbles have a high specific surface area, which not only effectively increases a mass transfer efficiency of ozone dissolved in water and improves the ozonation efficiency, but also prolongs a reaction time of the entire system, thereby further degrading organic matters in the permeate and improving a quality of the permeate. Moreover, the micro-nano bubbles can also flush and clean the hollow fiber nanofiltration membrane 42 or the hollow fiber reverse osmosis membrane, and degrade organic pollutants, such that the pollutants on a surface of the hollow fiber nanofiltration membrane 42 or the hollow fiber reverse osmosis membrane can be loosened or washed away.

Similarly, in step (4), the pressure of the concentrate discharged from the filtering device 4 is reduced such that a dissolved concentration of the ozone in the concentrate is decreased, and the ozone is released from the concentrate, causing the ozone to form micro-nano bubbles when released. This effectively increases the mass transfer efficiency of ozone dissolved in water, improves the ozonation efficiency, and prolongs the reaction time of the entire system, which can further degrade organic matters in the concentrate.

It should be noted that the hollow fiber nanofiltration membrane 42 or the hollow fiber reverse osmosis membrane has a filtering side and a permeate side. A pressure at the filtering side is higher than a pressure at the permeate side. The concentrate is generated at the filtering side. The permeate is generated at the permeate side. Therefore, when the ozone in the permeate generated at the permeate side is released to form the micro-nano bubbles, the hollow fiber nanofiltration membrane 42 or the hollow fiber reverse osmosis membrane can be flushed to avoid clogging.

In summary, the saline wastewater treatment method requires a high filtration pressure when filtering using the hollow fiber nanofiltration membrane 42 or the hollow fiber reverse osmosis membrane to dissolve ozone in high-pressure raw water. High pressure leads to an increase in the dissolved concentration of the ozone, thereby improving the ozonation efficiency and degradation of organic pollutants. A filtration and separation effect of the hollow fiber nanofiltration membrane 42 or the hollow fiber reverse osmosis membrane is used to remove salt and organic matters in the saline wastewater. In addition, the pressure of the permeate is controlled such that ozone dissolved in the permeate is released in the filtering device 4 to form the micro-nano bubbles, so as to flush and clean the hollow fiber nanofiltration membrane 42 or the hollow fiber reverse osmosis membrane, thereby avoiding clogging of the hollow fiber nanofiltration membrane 42 or the hollow fiber reverse osmosis membrane, and degrading organic pollutants on the surface of the hollow fiber nanofiltration membrane 42 or the hollow fiber reverse osmosis membrane. Moreover, the pressure of the concentrate is controlled such that the ozone in the concentrate discharged from the filtering device 4 is released to form the micro-nano bubbles. The high specific surface area of the micro-nano bubbles not only effectively increases the mass transfer efficiency of ozone dissolved in water and improves the ozonation efficiency, but also prolongs the reaction time of the entire system, allowing the organic pollutants in the concentrate to be basically ozonized.

In addition, compared to the prior art, the saline wastewater treatment method provided herein enables the simultaneous desalination and organic matter removal of the saline wastewater, and can avoid the fouling of the hollow fiber nanofiltration membrane 42 or the hollow fiber reverse osmosis membrane, allowing for shortened process and improved efficiency.

In some embodiments, the saline wastewater treatment method further includes the following step.

Step (6) A pressure inside the filtering device 4 is controlled such that ozone in the raw water sample is released inside the filtering device to form micro-nano bubbles to flush the filtering side of the hollow fiber nanofiltration membrane 42 or the hollow fiber reverse osmosis membrane.

Specifically, the pressure inside the filtering device 4 is controlled to decrease, that is, the pressure at the filtering side of the hollow fiber nanofiltration membrane 42 or the hollow fiber reverse osmosis membrane is decreased. During normal filtration of the raw water sample, the pressure inside the filtering device 4 is relatively high, that is, the pressure at the filtering side of the hollow fiber nanofiltration membrane 42 or the hollow fiber reverse osmosis membrane is relatively high, making it difficult to release ozone in the concentrate. After completing the filtration of the raw water sample, the pressure inside the filtering device 4 can be controlled to allow the pressure at the filtering side of the hollow fiber nanofiltration membrane 42 or the hollow fiber reverse osmosis membrane to reduce, such that ozone dissolved inside the filtering device 4 is released to form the micro-nano bubbles, thereby achieve flushing of the filtering side of the hollow fiber nanofiltration membrane 42 or the hollow fiber reverse osmosis membrane.

It should be noted that when the filtering side of the hollow fiber nanofiltration membrane or the hollow fiber reverse osmosis membrane is flushed, due to the reduction of the pressure, no permeate is produced at the permeate side of the hollow fiber nanofiltration membrane or the hollow fiber reverse osmosis membrane.

It can be understood that the permeate side of the hollow fiber nanofiltration membrane 42 or the hollow fiber reverse osmosis membrane can be flushed by the permeate, or the filtering side of the hollow fiber nanofiltration membrane 42 or the hollow fiber reverse osmosis membrane can be flushed by the concentrate.

In some embodiments, the saline wastewater treatment method further includes the following step.

The remaining ozone in the permeate is destroyed. It can be understood that in order to prevent the remaining ozone from escaping and causing air pollution and safety accidents, a tail gas needs to be destroyed, that is, the ozone needs to be destroyed. For example, a tail gas destruction device is used to destroy the ozone.

In some embodiments, the saline wastewater treatment method further includes the following step. Remaining ozone in the concentrate is destroyed. It can be understood that in order to prevent the remaining ozone from overflowing and causing air pollution and safety accidents, a tail gas needs to be destroyed, that is, the ozone needs to be destroyed. For example, a tail gas destruction device is used to destroy the ozone.

In some embodiments, when flushing the filtering side of the hollow fiber nanofiltration membrane or the hollow fiber reverse osmosis membrane, although no permeate is produced, it is still necessary to destroy the ozone in the raw water discharged from the filtering device to avoid ozone overflow causing air pollution and safety accidents.

Figure 2:
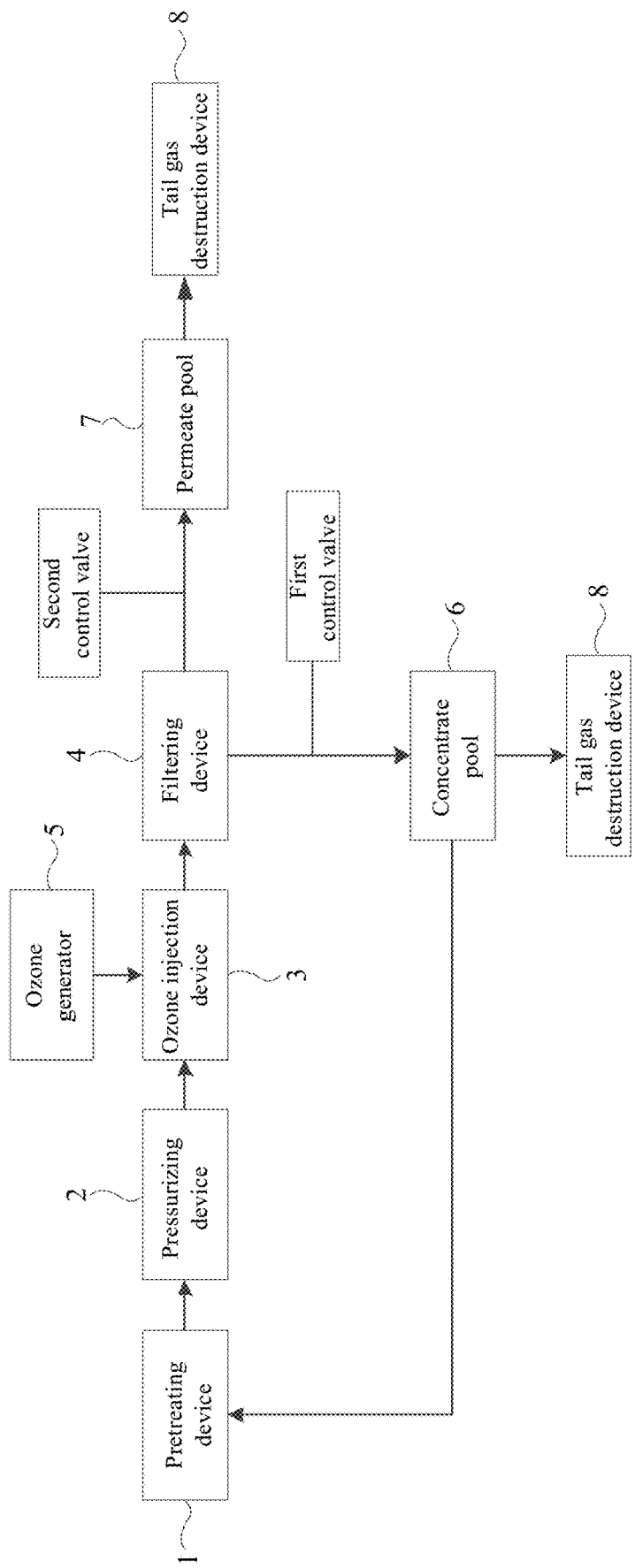
FIG. 2 is a block diagram of a saline wastewater treatment system in accordance with an embodiment of the present disclosure.

Based on the same inventive concept, the present disclosure also provides a saline wastewater treatment system, which adopts the above saline wastewater treatment method. As shown in FIG. 2, the saline wastewater treatment system includes a pretreating device 1, a pressurizing device 2, an ozone injection device 3, a filtering device 4 and an ozone generator 5. The pretreating device 1 is configured to pretreat raw water. The pressurizing device 2 is configured to pressurize the raw water. The ozone injection device 3 is connected to the filtering device 4. The ozone generator 5 is connected to the ozone injection device 3. The filtering device 4 includes a hollow fiber nanofiltration membrane 42 or a hollow fiber reverse osmosis membrane.

The pretreating device 1 is configured to pretreat the raw water, including but not limited to a sedimentation tank and a coarse filter. The pressurizing device 2 is configured to pressurize the raw water. In some embodiments, the pressurizing device 2 is a pressurizing pump. The ozone generator 5 is configured to generate ozone. The ozone injection device 3 is configured to inject ozone into pressurized raw water. In some embodiments, the ozone injection device 3 is a jet injection device.

Figure 3:
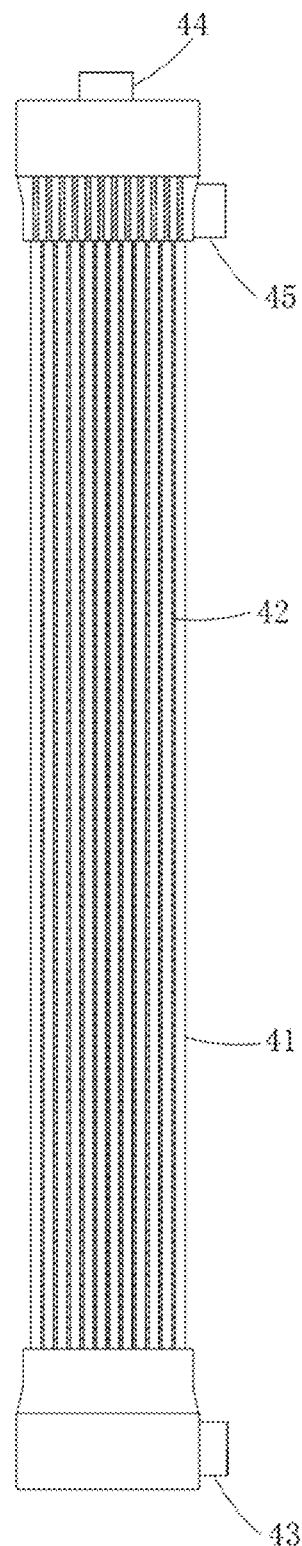
FIG. 3 is a first schematic structural diagram of a filtering device in accordance with an embodiment of the present disclosure.

In some embodiments, the hollow fiber nanofiltration membrane 42 is provided. As shown in FIG. 3, the filtering device 4 further includes a housing 41. A bottom of the housing 41 is provided with a raw water inlet pipe 43. A top of the housing 41 is provided with a permeate pipe 44 and a concentrate pipe 45. The permeate pipe 44 is arranged above the concentrate pipe 45. The hollow fiber nanofiltration membrane 42 is vertically mounted in the housing 41.

The concentrate pipe 45 is provided with a first control valve (not shown in the drawings). The permeate pipe 44 is provided with a second control valve (not shown in the drawings). In some embodiments, the first control valve is, but is not limited to, a pressure reducing valve. In some embodiments, the second control valve is, but is not limited to, a pressure reducing valve.

It can be understood that a pressure of a permeate can be controlled through the second control valve, that is, an opening of the second control valve affects the pressure of the permeate in the housing 41. The opening of the second control valve is adjusted such that ozone in the permeate is released inside the filtering device 4 to form micro-nano bubbles, which can flush and clean the hollow fiber nanofiltration membrane 42, degrade organic pollutants on a surface of the hollow fiber nanofiltration membrane 42, and enhance an oxidation effect on organic matters in the permeate.

The pressure of a concentrate can be controlled through the first control valve. During normal filtration of the raw water, it is necessary to ensure that a pressure at a filtering side of the hollow fiber nanofiltration membrane 42 can allow a permeate side of the hollow fiber nanofiltration membrane 42 to produce the permeate. Therefore, an opening of the first control valve is small. At this time, the pressure at the filtering side of the hollow fiber nanofiltration membrane 42 is high, and ozone in the concentrate is difficult to release. However, a pressure of the concentrate discharged from the housing 41 is reduced, such that ozone dissolved in the concentrate is released to form micro-nano bubbles. A high specific surface area of the micro-nano bubbles can effectively increase the mass transfer efficiency of ozone dissolved in water, improve the ozonation efficiency, and extend the reaction time of the entire system, such that organic pollutants in the concentrate can be basically ozonized.

When it is necessary to flush the filtering side of the hollow fiber nanofiltration membrane 42, the opening of the first control valve can be increased to reduce the pressure at the filtering side of the hollow fiber nanofiltration membrane 42, such that the ozone in the raw water is released to form micro-nano bubbles to flush the hollow fiber nanofiltration membrane 42. At this time, no permeate is produced at the permeate side of the hollow fiber nanofiltration membrane 42.

It should be noted that the hollow fiber nanofiltration membrane 42 has an internal channel. In some embodiments, referring to FIG. 3, the concentrate is generated in the internal channel and flows to the concentrate pipe 45, that is, the channel by which the raw water flows into the hollow fiber nanofiltration membrane 42. The permeate is generated at an outer side of the hollow fiber nanofiltration membrane 42, that is, an outer side of the internal channel.

Figure 4:
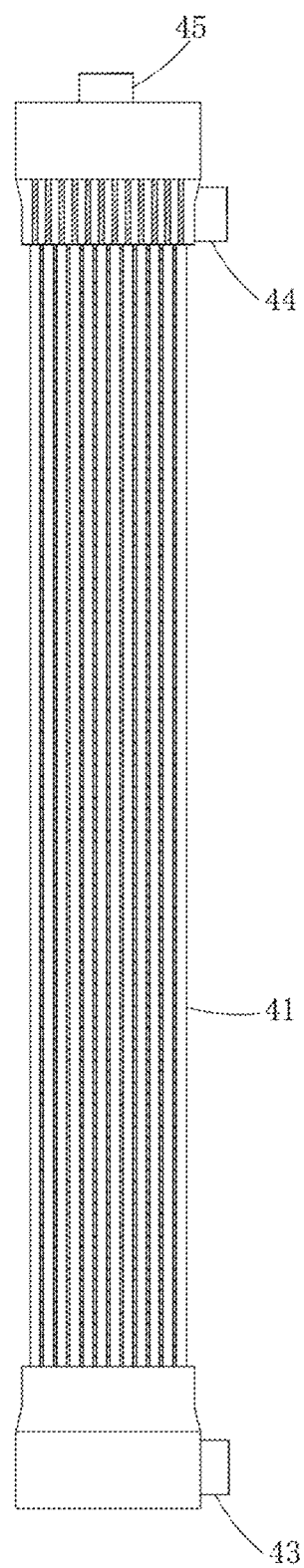
FIG. 4 is a second schematic structural diagram of the filtering device in accordance with an embodiment of the present disclosure.

In some embodiments, the hollow fiber nanofiltration membrane 42 is provided. As shown in FIG. 4, the filtering device 4 further includes the housing 41. The bottom of the housing 41 is provided with the raw water inlet pipe 43. The top of the housing 41 is provided with the permeate pipe 44 and the concentrate pipe 45. The concentrate pipe 45 is arranged above the permeate pipe 44. The hollow fiber nanofiltration membrane 42 is vertically mounted in the housing 41.

In such structure, the hollow fiber nanofiltration membrane 42 has an internal channel. The permeate is generated in the internal channel and flows to the permeate pipe 44, that is, the permeate is generated in the internal channel. The concentrate is produced at an outer side of the hollow fiber nanofiltration membrane 42, that is, an outer side of the internal channel.

In some embodiments, the saline wastewater treatment system further includes comprises a concentrate pool 6 for receiving the concentrate. The concentrate pool 6 is connected to the concentrate pipe 45 through a pipeline. The concentrate entering the permeate pool 6 is partially injected into the raw water.

In some embodiments, the saline wastewater treatment system further includes the permeate pool 7 for receiving the permeate. The permeate pool 7 is connected to the permeate pipe 44 through a pipeline.

In some embodiments, the saline wastewater treatment system is used to treat production wastewater of an electronics factory. The production wastewater is saline and difficult to degrade. Raw water of the production wastewater has a total dissolved solids (TDS) of about 5,000 mg/L and a COD of about 300 mg/L, and is organic matter that is difficult to degrade. The hollow fiber reverse osmosis membrane is provided. The pressurizing pump is used to pressurize pretreated wastewater to about 1.5 MPa, while high-pressure ozone is injected into the pretreated wastewater.

In the embodiment, a system recovery rate is controlled to 75% by controlling a ratio of a return flow of the concentrate to a discharge of tail water, that is, 75% of the permeate in the system is high-quality recycled water, and 25% of the tail water is discharged. A salt content and pollutant treatment effects of each step of the system are shown in Table 1.

TABLE 1

Salt content and pollutant treatment effects

| No. | Type | Salt content (mg/L) | CODCr (mg/L) |
|---|---|---|---|
| 1 | Raw water | 5000 | 300 |
| 2 | Pretreated raw water | 4800 | 250 |
| 3 | Permeate | 25 | 3 |
| 4 | Concentrate | 19100 | 50 |

It can be seen that the saline wastewater treatment method can not only obtain high-quality water through desalination, but also simultaneously degrade and remove organic matters in the raw water, achieving simultaneous desalination and removal of organic matters in a short process. Compared to a process of pretreatment+membrane bioreactor+ultrafiltration+reverse osmosis in the prior art, this application can simplify and shorten the treatment process, and reduce a site area and investment.

It should be noted that in this application, relational terms such as "first" and "second" are only used to distinguish one entity or operation from another entity or operation, and do not necessarily require or imply any actual relationship or order between these entities or operations. Furthermore, terms "comprise", "include", or any other variations thereof are intended to cover a non-exclusive inclusion such that a process, method, article, or apparatus includes not only those mentioned elements but also other elements not expressly listed, or elements that are inherent to such process, method, article, or apparatus. Without further limitation, an element defined by the statement "comprises a . . . " does not exclude the presence of additional identical elements in a process, method, article, or apparatus that includes the mentioned element.

Described above are merely some specific embodiments of the present disclosure, enabling those skilled in the art to understand or implement the present disclosure. Various modifications to these embodiments will be obvious to those skilled in the art, and the generic principles defined herein can be practiced in other embodiments without departing from the spirit or scope of the disclosure. Therefore, the present disclosure is not to be limited to the embodiments described herein, but is to be accorded the widest scope consistent with the principles and novel features disclosed herein.

What is claimed is:

1. A saline wastewater treatment method, comprising:
   (S1) pretreating a raw water sample to obtain a pretreated raw water sample;
   (S2) pressurizing the pretreated raw water sample to 0.4-8 MPa followed by ozone injection to obtain a pressurized and ozone-injected raw water sample where ozone is in a dissolved state;
   (S3) separating and filtering, by a filtering device with a hollow fiber nanofiltration membrane or a hollow fiber reverse osmosis membrane inside, the pressurized and ozone-injected raw water sample to obtain a concentrate and a permeate, wherein a pressure of the permeate is lower than a pressure of the raw water sample;
   (S4) controlling a pressure of the concentrate such that ozone in the concentrate discharged from the filtering device is released to form bubbles which have a diameter in a micrometer or nanometer range, and partially injecting the concentrate into a next pretreated raw water sample;
   (S5) controlling the pressure of the permeate such that ozone in the permeate is released inside the filtering device to form bubbles which have a diameter in a micrometer or nanometer range to flush a permeate side of the hollow fiber nanofiltration membrane or the hollow fiber reverse osmosis membrane; and
   (S6) controlling a pressure inside the filtering device such that ozone in the pressurized and ozone-injected raw water sample is released inside the filtering device to form bubbles which have a diameter in a micrometer or nanometer range to flush a filtering side of the hollow fiber nanofiltration membrane or the hollow fiber reverse osmosis membrane.

2. The saline wastewater treatment method of claim 1, further comprising:
   destroying remaining ozone in the permeate.

3. The saline wastewater treatment method of claim 2, further comprising:

destroying remaining ozone in the concentrate.

4. The saline wastewater treatment method of claim 1, wherein the hollow fiber nanofiltration membrane or the hollow fiber reverse osmosis membrane has the permeate side and the filtering side; a pressure at the filtering side is higher than a pressure at the permeate side; the concentrate is generated at the filtering side; and the permeate is generated at the permeate side.

* * * * *